United States Patent
Singh et al.

(10) Patent No.: US 12,306,957 B2
(45) Date of Patent: May 20, 2025

(54) AUTOMATED GENERATION OF ADAPTIVE-SECURITY AND COMPLIANCE-AWARE DISTRIBUTED SOFTWARE DELIVERY PIPELINES

(71) Applicant: Guardian Life Insurance Company of America, New York, NY (US)

(72) Inventors: Manas Singh, Chappaqua, NY (US); Naveen Kumar S, Tamil Nadu (IN); Balaji Mukundan, Mylapore (IN); Daniel Johnson, Slingerlands, NY (US)

(73) Assignee: Guardian Life Insurance Company of America, New York, NY (US)

( * ) Notice: Subject to any disclaimer, the term of this patent is extended or adjusted under 35 U.S.C. 154(b) by 170 days.

(21) Appl. No.: 17/974,783

(22) Filed: Oct. 27, 2022

(65) Prior Publication Data
US 2024/0143775 A1    May 2, 2024

(51) Int. Cl.
  G06F 17/00    (2019.01)
  G06F 21/57    (2013.01)
  H04L 29/06    (2006.01)

(52) U.S. Cl.
  CPC ...... *G06F 21/577* (2013.01); *G06F 2221/033* (2013.01)

(58) Field of Classification Search
  CPC ....... G06F 21/577; G06F 17/55; G06F 17/552
  USPC ........................................................... 726/1
  See application file for complete search history.

(56) References Cited

U.S. PATENT DOCUMENTS

| | | | |
|---|---|---|---|
| 10,216,509 B2 | 2/2019 | Martin Vicente et al. | |
| 10,228,936 B2 | 3/2019 | Suparna et al. | |
| 10,437,585 B2 | 10/2019 | Mills | |
| 10,671,368 B2 | 6/2020 | Brealey et al. | |
| 2013/0219496 A1* | 8/2013 | Nie ..................... | H04L 63/1408 726/22 |
| 2017/0214705 A1* | 7/2017 | Gupta .................. | G06F 21/577 |
| 2019/0163355 A1* | 5/2019 | Govindaraju ............ | G06F 8/71 |
| 2019/0361697 A1 | 11/2019 | Hu et al. | |
| 2020/0021620 A1* | 1/2020 | Puratheppparambil ....................... | H04L 63/102 |

* cited by examiner

*Primary Examiner* — Jeffrey C Pwu
*Assistant Examiner* — Samuel Ambaye
(74) *Attorney, Agent, or Firm* — Danielle C. Sullivan; Carter, Ledyard & Millburn LLP

(57) ABSTRACT

A system and method for generating security and compliance-aware software delivery pipelines includes a dashboard for configuring and inputting an application profile and an application context. In addition, the system and method each include an application profiler captures, discovers, and stores one or more attributes of an application, along with a pipeline generator that receives information from the dashboard to ultimately generate at least one software delivery pipeline outfitted with security policies and compliance-aware guidelines.

6 Claims, 3 Drawing Sheets

AUTOMATED GENERATION OF ADAPTIVE-SECURITY AND COMPLIANCE-AWARE DISTRIBUTED SOFTWARE DELIVERY PIPELINES

TECHNICAL FIELD

This disclosure relates to software delivery pipeline generation and, more particularly, to systems and methods of automatically generating adaptive security and compliance-aware distributed software delivery pipelines.

BACKGROUND

When organizations develop business applications with differing levels of security, compliance, service level agreements, and testing and deployment needs, continuous integration and continuous deployment pipelines with standard security controls and security scans are typically used in delivering these business applications. This system of business application development and software delivery pipeline generation adds unnecessary burdens in forms of large investments in time, monitoring, and enforcement of software pipeline policies, as well as additional risks in maintain the organization's cybersecurity integrity, given the large number of items that one has keep track of for software pipeline systems in general.

Prior to this disclosure, attempts to reduce problems from software delivery pipeline generation came in forms of developing multiple software delivery pipelines, one pipeline at a time. Another option was to manually increase consistent and standard controls across an organization with third-party cybersecurity applications that would keep track of multiple software delivery pipeline activities.

SUMMARY OF THE DISCLOSURE

In one implementation, a system for generating security and compliance-aware software delivery pipelines is based on an application profile and an application context. The system includes a dashboard for configuring and inputting the application profile and the application context, an application profiler configured to capture, discover, and store one or more attributes of an application, and a pipeline generator configured to receive information from the dashboard.

One or more of the following features may be included. The system may include the pipeline generator having a template engine configured to generate and compose at least one software delivery pipeline. The system may include an application profile parser configured to extract the application profile and the application context. The system may include a scan configuration generator configured to generate policies, security services, and other security configurations. The system may include a continuous integration composer configured to compose security controls for the at least one software delivery pipeline; compose the security controls based on the application profile; and onboard the application profile and the application context to managed security services while using the policies generated by the scan configuration generator. The system may include a continuous deployment composer configured to compose at least one security control and at least one deployment policy of the at least one software delivery pipeline, wherein the at least one security control and the at least one deployment policy are based on the application profile. The system may include a post-deployment template composer configured to generate [at least one additional software delivery pipeline] for long-running processes.

In another implementation, a method for generating security and compliance-aware software delivery pipelines is based on an application profile and an application context. The method includes configuring and inputting the application profile and the application context into a dashboard; capturing, discovering, and storing one or more attributes of an application via an application profiler; and configuring a pipeline generator to enable the pipeline generator to receive information from the dashboard.

One or more of the following features may be included. The method may include generating or composing at least one software delivery pipeline via a template engine and extracting the application profile and the application context with an application profile parser. The method may include generating policies, security services, and other security configurations with a scan configuration generator. The method may include composing security controls for the at least one software delivery pipeline with a continuous integration composer; composing the security controls based on the application profile with the continuous integration composer; and onboarding the application profile and the application context with the continuous integration composer; enabling management of the security services via the continuous integration composer; and implementing the policies generated by the scan configuration generator.

The method may include composing at least one security control and at least one deployment policy of the at least one software delivery pipeline with a continuous deployment composer, wherein the at least one security control and the at least one deployment policy are based on the application profile as well as generating a pipeline for at least one long-running process with a post-deployment template composer.

The details of one or more implementations are set forth in the accompanying drawings and the description below. Other features and advantages will become apparent from the description, the drawings, and the claims.

BRIEF DESCRIPTION OF THE DRAWINGS

Various embodiments in accordance with the present disclosure will be described with reference to the drawings, in which.

DETAILED DESCRIPTION OF THE PREFERRED EMBODIMENTS

Figure 1:
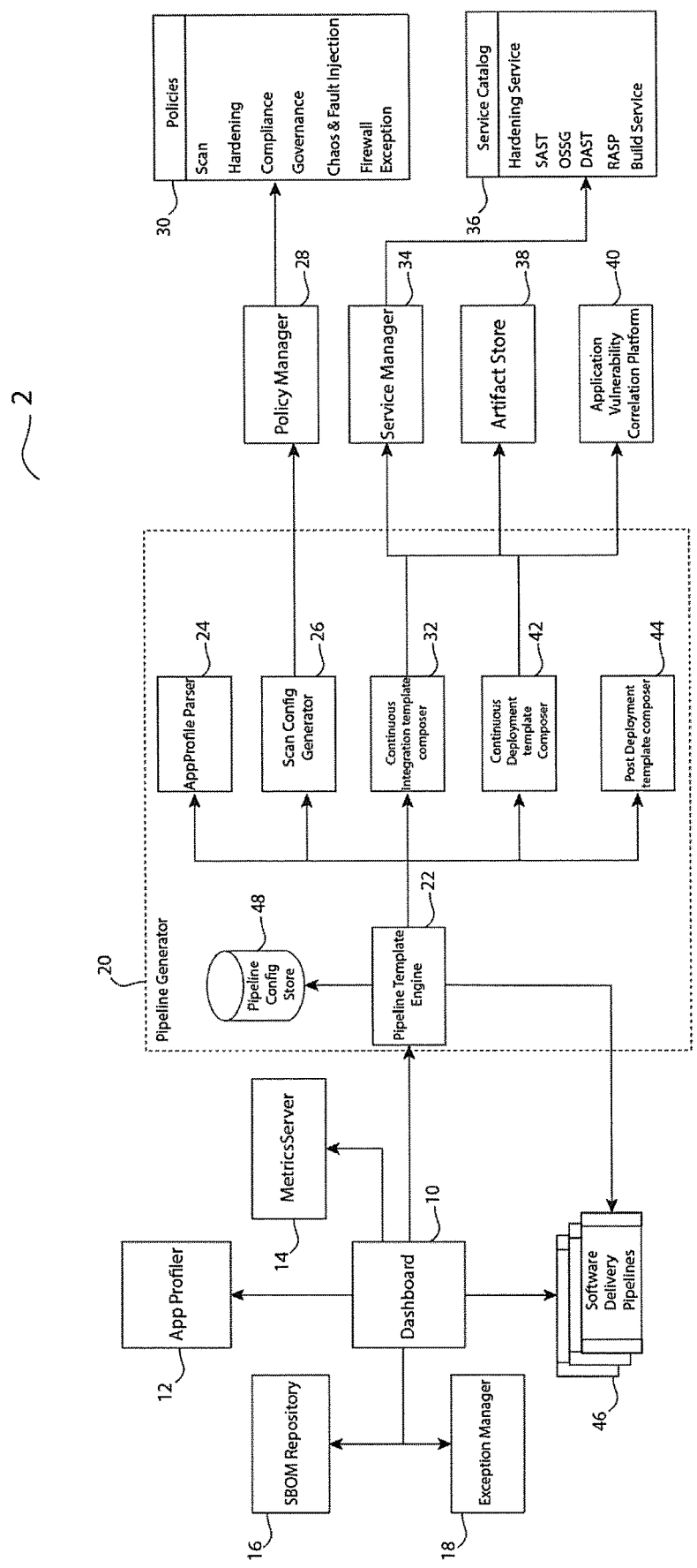
FIG. 1 illustrates an example of a system for generating security and compliance-aware software delivery pipelines.

Referring to FIG. 1, there is shown a system for generating security and compliance-aware software delivery pipelines 2. Dashboard 10 is a user interface that presents information to a user. Dashboard 10 enables a user to configure and input information of an application profile and an application context. An application profile may include, but is not limited to, policies and guidelines for a particular computer application, as well as attributes which may include: an application's privacy risk ranking; protected health information; personally identifiable information; key or significant financial systems for obtaining and recording financial information; externally-facing features; business critical system attributes; service-level agreements; and computer-system availability. An application context may include, but is not limited to: a professional industry area for which the application may be useful; workload context; deployment context (e.g., cloud-based or based on-premises); and business context.

FIG. 1 further shows an application profiler 12 (shown as "App Profiler") that is configured to capture, discover, and store one or more attributes of the computer application associated with the application profile and the application context of dashboard 10. The application profiler 12 may capture, discover, and store one or more attributes of the computer application following the user's configuration and input of information in dashboard 10.

Alternative embodiments include a MetricsServer 14, which may capture: software quality code; code commits; test coverages; and security scanned related to metrics from generated software delivery pipelines, a software bill of materials repository 16 (shown as "SBOM Repository" in FIG. 1), and an exception manager 18 which may handle time-bound exceptions and requests for at least one scan rule or policy for managed security services configured within a software pipeline.

A pipeline generator 20 may receive information from the dashboard 10 or the application profiler to ultimately generate at least one software delivery pipeline. The pipeline generator 20 may include a pipeline template engine 22 that is configured to generate and compose the at least one software delivery pipeline. Moreover, the pipeline generator 20 may generate the at least one software delivery pipeline via input configurations from the dashboard 10 and the application profiler 12. An application profile parser 24 (shown in FIG. 1 as "AppProfile Parser"), as a component of the pipeline generator 20, parses information from the application profile and the application context to assist the pipeline generator 20 in development of the at least one software delivery pipeline to capture attributes, which may include privacy risk ranking; protected health information; personally identifiable information; key or significant financial systems for obtaining and recording financial information; externally-facing features; business critical system attributes; service-level agreements; and computer-system availability.

As pipeline generator 20 is generating the at least one software delivery pipeline, a scan configuration generator 26 (shown in FIG. 1 as "Scan Config Generator") generates policies, security services, and other security configurations for the at least one software delivery pipeline. In alternative embodiments, the scan configuration generator 26 possesses a policy manager 28 which may craft or manage pipeline policies 30 based on information obtained from dashboard 10, application profiler 12, or application parser 24. The policy manager 28 may also act as an interface for ingesting policies and ruled generated by the scan configuration generator 26. The policy manager 28 may also transform policies to a given format to apply those policies to a managed security service catalog 36. Policies and rules that may be managed by the policy manager 28 may include security hardening, compliance checks, security governance, chaos and fault injections, reliability tests, and cybersecurity scoring. The scan configuration generator 26 may function by generating scan policies and managed serviced configured through the policy manager 28. The policy manager 28 may be onboarded in a generated pipeline through a service manager 34.

FIG. 1 also shows a continuous integration composer 32 (also known as a continuous integration template composer, as shown in FIG. 1) as a component of pipeline generator 20. The continuous integration composer 32 may compose and may generate application and infrastructure pipeline(s) as code as well as integrate security controls based on information retrieved from the application profile 12. Furthermore, the continuous integration composer 32 may compose rules for merging developers' working copies to a shared mainline. In alternative embodiments, the continuous integration composer 32 may onboard the application profile and the application context towards managed security services within the service manager 34 while using the policies generated by the scan configuration generator 26. The service manager 34 of the continuous integration composer 32 may further provide a service catalog 36 that may include, but would not be limited to, a build service, dynamic application security testing (DAST), or Runtime Application Self Protection (RASP). In alternative embodiments, data of the continuous integration composer may be stored in an artifact store 38, which behaves as a repository that is independent from the pipeline generator 20. The data of the continuous integration composer may also be sent to an application vulnerability correlation platform 40, which may include a process management tool for streamlining software development life cycle application vulnerability remediation. The vulnerability correlation platform may also aggregate and correlate scan results into a centralized tool.

A continuous deployment composer 42 (also shown as a continuous deployment template composer 42), like the continuous integration composer 32, can compose at least one security control within the pipeline generator 20. The continuous deployment composer 42 may also compose at least one deployment policy (e.g., installation policies, testing policies, etc.) for the at least one software delivery pipeline being generated by pipeline generator 20. Each of the at least one security control and at least one deployment policy may be based on information of the application profile. In an alternative embodiment, the continuous deployment composer 42 may create guidelines for deploying software releases or new code updates into a live production environment that may be visible to customers.

FIG. 1 includes a post-deployment template composer 44 that may generate at least one additional software delivery pipeline for long-running processes via input from the application profile parser 24 and the scan configuration generator 26. The post-deployment template composer 44 and its long-running processes may include running long-running active DAST scans on deployed applications; coordinating and running chaos and fault injection experiments on deployed applications; and running recorded functional tests. The additional software delivery pipeline may be paired with the at least one software delivery pipeline from the pipeline generator 20 to ultimately have all pipelines become available at one time (see numeral 46 on FIG. 1). Moreover, the pipeline template engine 22 may engage with a pipeline configuration store 48 for retrieving or storing pipeline configurations.

Figure 2:
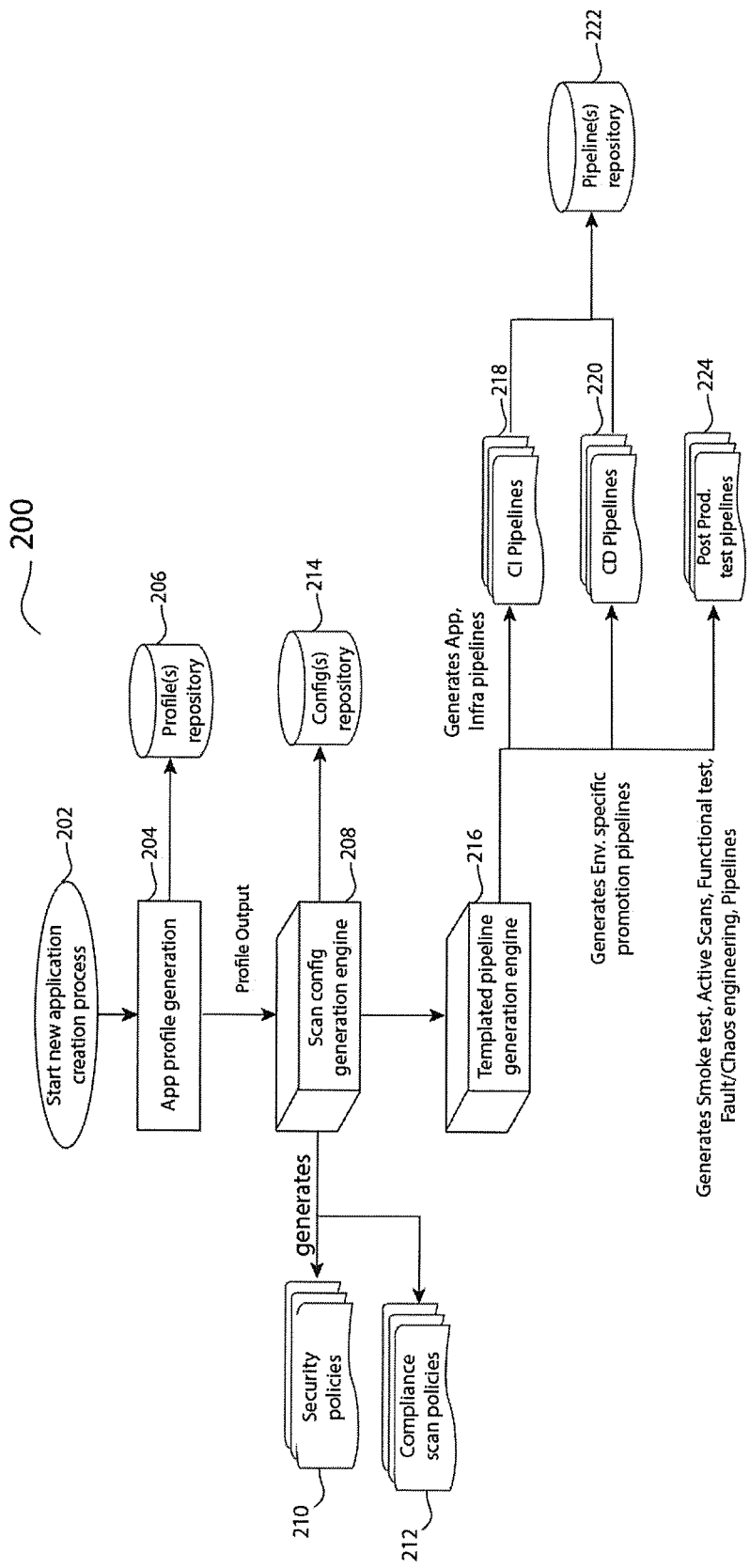
FIG. 2 illustrates an example of a method of operating a system for generating security and compliance-aware software delivery pipelines.

Referring to FIG. 2, there is shown a method operations flowchart of a system for generating security and compliance-aware software delivery pipelines 200. Operation of the system begins when a user, who desires to obtain at least one software delivery pipeline possessing desirable security and compliance characteristics, creates a new application within an application creation process (step 202) that is capable of being performed in dashboard 10.

Upon the completion of the application creation process (step 202), an application profile is generated (step 204) and included in a profile repository 206 for data storage and data retrieval purposes. Information of the application profile is then outputted to a scan configuration generation engine 208, which generates policies (e.g., security policies 210 and compliance scan policies 212), security services, and other security configurations for at least one software delivery pipeline. Data of the scan configuration engine 208 may be stored in a config repository 214 for future exchanges and implementations.

Information is subsequently exchanged between the scan configuration generation engine 208 and a templated pipeline generation engine 216. The templated pipeline generation engine 216 uses information from the scan configuration engine 208 to generate or prepare at least one application infrastructure pipeline (e.g., continuous integration pipelines 218 and continuous deployment pipelines 220) for eventual use with at least one other software delivery pipeline generated by pipeline generator 20. Data of all these pipelines may be stored in a pipeline repository 222 for future exchanges and implementations. In alternative embodiments, post production test pipelines 224 may be generated by the templated pipeline generation engine 216 to implement post-production processes, such as smoke tests, active scans, and pipelines concerning chaos-engineering. Ultimately, the user's application may be outfitted with at least one security and compliance-aware software delivery pipeline.

Figure 3:
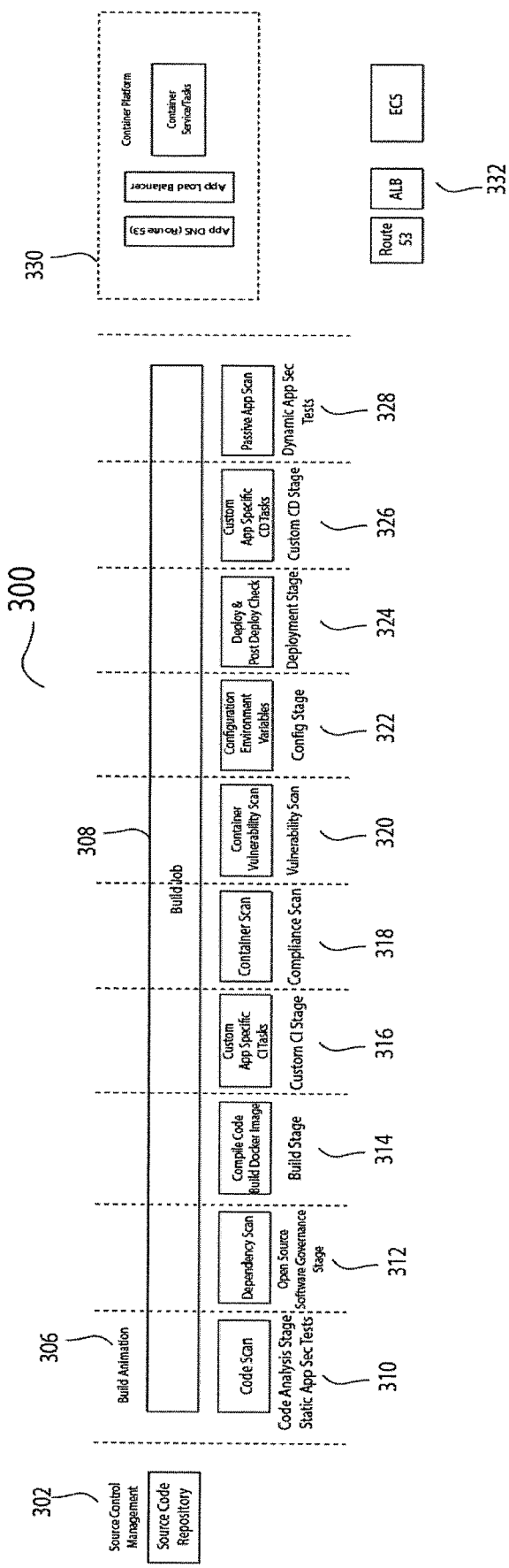
FIG. 3 illustrates an example of a system for generating security and compliance-aware software delivery pipelines in a framework view.

Referring to FIG. 3, there is shown a framework view of a system 300 for generating security and compliance-aware software delivery pipelines. A source control management stage 302 includes a source code repository 304. An example of such source code repository 304 may include Bitbucket, a Git-based source code repository hosting service. A plugin to scan for code credentials in the source code repository 304 may also be included. In the source control management stage 302, source code from source code repository 304 may be used in a build automation stage 306, wherein a series of systems are executed under a build job 308. The build job 308 may include multiple scans, compilations, image builds, tasks, configurations, and checks. For example, a code scan 310 may be executed to analyze code from source code repository 304 to enable scanning for security issues via tests (e.g., a static application security test). The code scan 310 may be executed via an open-source platform that may perform continuous inspection of code quality (e.g., to detect bugs, code smells, or the like), such as SonarQube. A dependency scan 312 may be performed to identify project dependencies (i.e., a task that relies on the completion of a different task) and check for any known, publicly disclosed, vulnerabilities in components that may affect an application. The dependency scan 312 may be performed with a cybersecurity service, such as a service provided by cloud-computing-company Snyk. During build job 308, code may be compiled, and an image may be built for system administration purposes (stage 314). For example, Jenkins, an open-source automation service; Docker, a set of platform as a service products that use OS-level virtualization to deliver software in packages called containers; and Kaniko, a tool for building container images from a Dockerfile, may be employed in stage 314. Docker build commands may also be employed to build docker images. Furthermore, continuous integration tasks may be performed within custom, application specific settings (stage 316) based on the source code repository. Stage 316 may be performed with Jenkins, Bash (a Unix shell and command language), or Groovy (a dynamic object-oriented programming language for the Java virtual machine (JVM) that can be used anywhere Java is used). A compliance scan 318 and a vulnerability scan 320 may be implemented to ensure that aspects of build job 308 are within security and compliance guidelines of system 300. Also, the compliance scan 318 and the vulnerability scan 320 may be performed on a docker image for a containerized workload or for an application running on virtual machines. These scans may be executed with Hadolint (a Dockerfile linter to build best practice Docker images), Docker Bench for Security (a script that checks for best-practices in deploying Docker containers), Prisma (a cloud-security suite that provides services for rule-based security policies), or Clair (a tool that monitors security of Docker containers through static analysis of vulnerabilities in Docker containers). A configuration stage 322 may be implemented to track versions and changes within build automation 306. For example, Jenkins's Credential Manager or Amazon Web Service's Secrets Manager (a service that helps protect access to applications) may be employed in this stage. The configuration stage 322 may also include configuration environment variables (e.g., shell commands, token passing, etc.). Deployment of the system 300 may take place during a deployment stage 324 and a custom continuous deployment stage 326, wherein one or more checks may be executed to ensure that deployments meet guidelines of the system 300. Examples of tools used in these stages include Jenkins, Amazon Elastic Compute Cloud (which allows users to rent virtual computers to run their own computer applications), Bash, and Groovy. Additional tests, such as dynamic application security tests 328 (also known as passive application scans) may be executed in the system 300. For example, such tests may be executed with OWASP ZAP, an open-source web application security scanner.

FIG. 3 further shows build job 308 exchanging information with container platform 330, which may include an elastic container service or an elastic Kubernetes service. Container platform 330 may function with web services, such as Amazon Route 53, Amazon Web Services's application load balancer, and open source container services or tasks. Infrastructure components 332 may include software deployment locations (e.g., Amazon Route 53 [Route 53] for connecting user requests to internet applications running on the cloud or on-premises; the Application Load Balancer [ALB]; and the Amazon Elastic Container Service [ECS]).

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A system for generating security and compliance-aware software delivery pipelines based on an application profile and an application context, comprising:
    a dashboard for configuring and inputting the application profile and the application context;
    an application profiler configured to capture, discover, and store one or more attributes of an application; and
    a pipeline generator configured to receive information from the dashboard wherein the pipeline generator comprises a template engine configured to generate and compose at least one software delivery pipeline and an application profile parser configured to extract the application profile and the application context;
    a scan configuration generator configured to generate policies, security services, and other security configurations; and
    a continuous integration composer configured to:
    compose security controls for the at least one software delivery pipeline;
    compose the security controls based on the application profile; and
    onboard the application profile and the application context to managed security services while using the policies generated by the scan configuration generator.

2. The system as claimed in claim 1, further comprising a continuous deployment composer configured to compose at least one security control and at least one deployment policy of the at least one software delivery pipeline, wherein the at least one security control and the at least one deployment policy are based on the application profile.

3. The system as claimed in claim 1, further comprising a post-deployment template composer configured to generate at least one additional software delivery pipeline for long-running processes.

4. A method for generating security and compliance-aware software delivery pipelines based on an application profile and an application context, comprising:
    configuring and inputting the application profile and the application context into a dashboard;
    capturing, discovering, and storing one or more attributes of an application via an application profiler;
    configuring a pipeline generator to enable the pipeline generator to receive information from the dashboard;
    generating or composing at least one software delivery pipeline via a template engine;
    extracting the application profile and the application context with an application profile parser;
    generating policies, security services, and other security configurations with a scan configuration generator;
    composing security controls for the at least one software delivery pipeline with a continuous integration composer
    based on the application profile;
    onboarding the application profile and the application context with the continuous integration composer;
    enabling management of the security services via the continuous integration composer; and
    implementing the policies generated by the scan configuration generator.

5. The method as claimed in claim 4, further comprising composing at least one security control and at least one deployment policy of the at least one software delivery pipeline with a continuous deployment composer, wherein the at least one security control and the at least one deployment policy are based on the application profile.

6. The method as claimed in claim 4, further comprising generating a pipeline for at least one long-running process with a post-deployment template composer.

* * * * *